United States Patent
Uneura et al.

(10) Patent No.: US 11,441,602 B2
(45) Date of Patent: Sep. 13, 2022

(54) BEARING STRUCTURE AND TURBOCHARGER

(71) Applicant: IHI Corporation, Tokyo (JP)

(72) Inventors: Yutaka Uneura, Tokyo (JP); Takahiro Tanaka, Tokyo (JP); Hiroki Mochizuki, Tokyo (JP); Shunsuke Nishii, Tokyo (JP); Hideyuki Kojima, Tokyo (JP)

(73) Assignee: IHI Corporation, Tokyo (JP)

( * ) Notice: Subject to any disclaimer, the term of this patent is extended or adjusted under 35 U.S.C. 154(b) by 0 days.

(21) Appl. No.: 17/084,716

(22) Filed: Oct. 30, 2020

(65) Prior Publication Data

US 2021/0054879 A1 Feb. 25, 2021

Related U.S. Application Data

(63) Continuation of application No. PCT/JP2019/023893, filed on Jun. 17, 2019.

(30) Foreign Application Priority Data

Jul. 27, 2018 (JP) .............................. JP2018-140951

(51) Int. Cl.
  *F16C 19/54* (2006.01)
  *F16C 19/16* (2006.01)
  (Continued)

(52) U.S. Cl.
  CPC .......... *F16C 19/548* (2013.01); *F16C 19/163* (2013.01); *F16C 37/00* (2013.01);
  (Continued)

(58) Field of Classification Search
  CPC .... F16C 19/163; F16C 19/547; F16C 19/548; F16C 35/077; F16C 37/007;
  (Continued)

(56) References Cited

U.S. PATENT DOCUMENTS 3,698,777 A * 10/1972 McCoy ................. F16C 33/585
  384/467
9,784,315 B2 * 10/2017 Koda .................... F16C 19/548
(Continued)

FOREIGN PATENT DOCUMENTS

CN 1382897 A * 12/2002 ............. F01D 25/18
CN 101040129 A 9/2007
(Continued)

OTHER PUBLICATIONS

Combined Chinese Office Action and Search Report dated Jul. 26, 2021 in Patent Application No. 201980031873.X (with English translation of Category of Cited Documents), received on Aug. 10, 2021, 9 pages.
(Continued)

*Primary Examiner* — Marcus Charles
(74) *Attorney, Agent, or Firm* — Oblon, McClelland, Maier & Neustadt, L.L.P.

(57) ABSTRACT

A bearing structure includes: a shaft provided with a turbine impeller; a pair of rolling bearings accommodated in a bearing hole and each including: an inner ring provided to the shaft; and an outer ring having a damper portion formed on an outer periphery of the outer ring; an opposing surface opposed to, from a turbine impeller side, a lateral surface of the outer ring of the rolling bearing provided on the turbine impeller side; and a first oil supply groove formed in the opposing surface and opposed to at least the damper portion and the lateral surface of the outer ring.

18 Claims, 4 Drawing Sheets

(51) Int. Cl.
- *F01D 25/16* (2006.01)
- *F16C 35/07* (2006.01)
- *F16C 37/00* (2006.01)
- *F16C 35/077* (2006.01)

(52) U.S. Cl.
CPC .......... *F01D 25/16* (2013.01); *F05B 2220/40* (2013.01); *F05B 2240/54* (2013.01); *F05B 2240/98* (2013.01); *F16C 35/077* (2013.01); *F16C 2360/24* (2013.01)

(58) Field of Classification Search
CPC ...... F16C 2360/24; F01D 25/16; F01D 25/18; F02B 39/00; F05B 2220/40; F05B 2240/54; F05B 2260/98
USPC .......................................... 384/99, 462, 467
See application file for complete search history.

(56) References Cited

U.S. PATENT DOCUMENTS

| | | | |
|---|---|---|---|
| 10,408,260 B2 * | 9/2019 | Uneura | F16C 33/586 |
| 2009/0193840 A1 | 8/2009 | Kurihara et al. | |
| 2016/0252134 A1 * | 9/2016 | Koda | F16C 33/585 |
| | | | 384/462 |
| 2018/0119572 A1 * | 5/2018 | Uneura | F02B 39/14 |
| 2018/0252265 A1 | 9/2018 | Uneura | |

FOREIGN PATENT DOCUMENTS

| | | | | | |
|---|---|---|---|---|---|
| CN | 104420899 A | | 3/2015 | | |
| CN | 106460653 A | | 2/2017 | | |
| CN | 108291482 A | | 7/2018 | | |
| CN | 110462230 A | * | 11/2019 | .......... | F16C 33/6659 |
| DE | 102016211569 A1 | * | 12/2017 | ............ | F16C 35/067 |
| DE | 102017126005 A1 | * | 3/2019 | ................ | F02C 7/06 |
| JP | 60-43137 U | | 3/1985 | | |
| JP | 1-127939 U | | 8/1989 | | |
| JP | H06101494 A | * | 4/1994 | ............ | F16C 19/163 |
| JP | 2530995 Y2 | | 4/1997 | | |
| JP | 09294351 A | * | 11/1997 | ............ | F16C 37/007 |
| JP | 2005-171796 A | | 6/2005 | | |
| JP | 2009-185715 A | | 8/2009 | | |
| JP | 2017-15148 A | | 1/2017 | | |
| JP | 6168739 B2 | | 7/2017 | | |
| JP | 6168739 B2 | * | 7/2017 | ............ | F16C 19/548 |
| JP | 2018123780 A | * | 8/2018 | ............ | F16C 35/077 |
| WO | WO-2007023702 A1 | * | 3/2007 | ............ | F16C 27/045 |
| WO | WO 2015/060304 A1 | | 4/2015 | | |
| WO | WO-2015060304 A1 | * | 4/2015 | ............ | F01D 25/16 |
| WO | WO 2017/006865 A1 | | 1/2017 | | |
| WO | WO-2017006865 A1 | * | 1/2017 | ............ | F02B 39/14 |
| WO | WO 2017/082166 A1 | | 5/2017 | | |
| WO | 2019/135326 A1 | | 7/2019 | | |

OTHER PUBLICATIONS

German Office Action issued in German Patent Application No. 11 2019 003 793.5 dated Jun. 13, 2022.

International Search Report dated Jul. 16, 2019 in PCT/JP2019/023893 filed Jun. 17, 2019 (with English translation), 3 pages.

* cited by examiner

BEARING STRUCTURE AND TURBOCHARGER

CROSS REFERENCE TO RELATED APPLICATIONS

This application is a continuation application of International Application No. PCT/JP2019/023893, filed on Jun. 17, 2019, which claims priority to Japanese Patent Application No. 2018-140951, filed on Jul. 27, 2018, the entire contents of which are incorporated by reference herein.

BACKGROUND ART

Technical Field

The present disclosure relates to a bearing structure and a turbocharger.

Related Art

In some cases, a turbocharger may include rolling bearings, for example, as described in Patent Literature 1. The rolling bearings are provided on a turbine side and a compressor side, respectively.

CITATION LIST

Patent Literature

Patent Literature 1: JP 6168739 B

SUMMARY

Technical Problem

In the turbocharger, the temperature on the turbine side is liable to be higher than the temperature on the compressor side. Therefore, there is a demand for improving a cooling performance for the rolling bearing provided on the turbine side.

The present disclosure has an object to provide a bearing structure and a turbocharger capable of improving a cooling performance for a rolling bearing provided on a turbine side.

Solution to Problem

In order to solve the above-mentioned problem, according to one aspect of the present disclosure, there is provided a bearing structure, comprising: a shaft provided with a turbine impeller; a pair of rolling bearings accommodated in a bearing hole and each including: an inner ring provided to the shaft; and an outer ring having a damper portion formed on an outer periphery of the outer ring; an opposing surface opposed to, from a turbine impeller side, a lateral surface of the outer ring of the rolling bearing provided on the turbine impeller side; and a first oil supply groove formed in the opposing surface and opposed to at least the damper portion and a lateral surface of the outer ring.

The outer ring may be rotatable with respect to a bearing housing in which the bearing hole is formed.

The first oil supply groove may extend to at least a position opposed to, in an axial direction of the shaft, an innermost portion in a radial direction of the lateral surface of the outer ring, and wherein the opposing surface may include an opposing portion that continues to the first oil supply groove in a circumferential direction of the shaft and that is closest to the lateral surface of the outer ring on the opposing surface.

The bearing structure may comprise a second oil supply groove formed in an inner peripheral surface of the bearing hole and opposed to the damper portion, and extending in the axial direction of the shaft to the first oil supply groove.

The bearing structure may comprise: a first oil passage formed in the inner peripheral surface of the bearing hole and opened toward the rolling bearing provided on the turbine impeller side; a second oil passage formed in the inner peripheral surface of the bearing hole and opened toward the rolling bearing provided on a compressor impeller side; and a third oil passage formed in the inner peripheral surface of the bearing hole and opened between the first oil passage and the second oil passage.

The pair of rolling bearings may be angular bearings having a face-to-face duplex configuration.

In order to solve the above-mentioned problem, according to one aspect of the present disclosure, the turbocharger includes the bearing structure described above.

Effects of Disclosure

According to the present disclosure, it is possible to improve a cooling performance for a rolling bearing provided on a turbine side.

DESCRIPTION OF EMBODIMENTS

Figure 1:
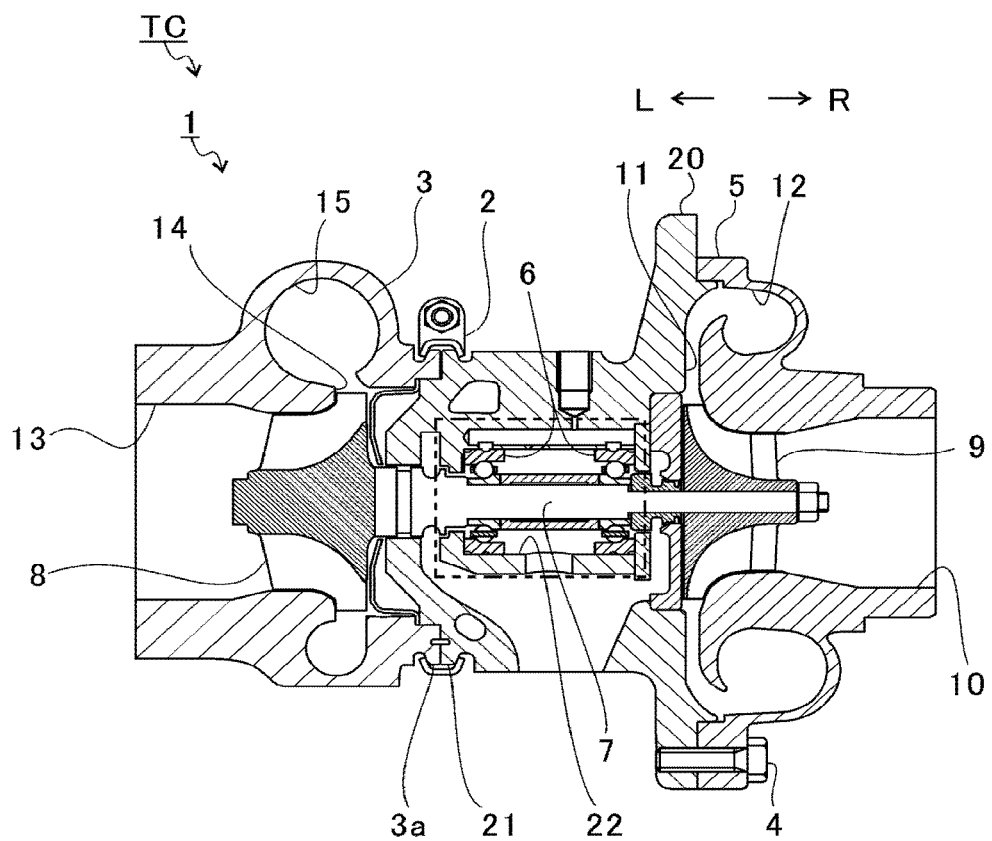
FIG. 1 is a schematic sectional view for illustrating a turbocharger.

Now, with reference to the attached drawings, an embodiment of the present disclosure is described. Dimensions, materials, and specific numerical values, and the like described in the embodiment are merely examples used for facilitating the understanding, and do not limit the present disclosure otherwise particularly noted. Elements having substantially the same functions and configurations herein and in the drawings are denoted by the same reference symbols to omit redundant description thereof, and illustration of elements with no direct relationship to the present disclosure is omitted.

FIG. 1 is a schematic sectional view for illustrating a turbocharger TC. In the following, a direction indicated by the arrow L illustrated in FIG. 1 corresponds to a left side of the turbocharger TC. A direction indicated by the arrow R illustrated in FIG. 1 corresponds to a right side of the turbocharger TC. As illustrated in FIG. 1, the turbocharger TC includes a turbocharger main body 1. The turbocharger main body 1 includes a bearing housing 20. A turbine housing 3 is coupled to the left side of the bearing housing 20 by a fastening mechanism 2. A compressor housing 5 is coupled to the right side of the bearing housing 20 by fastening bolts 4.

A protrusion 21 is formed on an outer peripheral surface of the bearing housing 20. The protrusion 21 is formed on the turbine housing 3 side. The protrusion 21 protrudes in a radial direction of the bearing housing 20. A protrusion 3a is formed on an outer peripheral surface of the turbine housing 3. The protrusion 3a is formed on the bearing housing 20 side. The protrusion 3a protrudes in a radial direction of the turbine housing 3. The protrusions 21 and 3a are band-fastened by the fastening mechanism 2. The fastening mechanism 2 is, for example, formed of a G coupling configured to clamp the protrusions 21 and 3a.

A bearing hole 22 is formed in the bearing housing 20. The bearing hole 22 penetrates in a right-and-left direction of the turbocharger TC. A pair of rolling bearings 6 are provided in the bearing hole 22. The shaft 7 is rotatably supported by the rolling bearings 6. A turbine impeller 8 is provided at a left end portion of the shaft V. The turbine impeller 8 is rotatably accommodated in the turbine housing 3. A compressor impeller 9 is provided at a right end portion of the shaft 7. The compressor impeller 9 is rotatably accommodated in the compressor housing 5.

An intake port 10 is formed in the compressor housing 5. The intake port 10 is opened on the right side of the turbocharger TC. The intake port 10 is connected to an air cleaner (not shown). A diffuser flow passage 11 is defined by the bearing housing 20 and the compressor housing 5 coupled to each other by the fastening bolts 4. The diffuser flow passage 11 increases pressure of air. The diffuser flow passage 11 is formed in an annular shape from an inner side toward an outer side in a radial direction of the shaft 7 (hereinafter simply referred to as "radial direction"). The diffuser flow passage 11 communicates with the intake port 10 on the inner side in the radial direction via the compressor impeller 9.

A compressor scroll flow passage 12 is formed inside the compressor housing 5. The compressor scroll flow passage 12 has an annular shape. The compressor scroll flow passage 12 is located on an outer side in the radial direction with respect to the compressor impeller 9. The compressor scroll flow passage 12 communicates with an intake port of an engine (not shown). The compressor scroll flow passage 12 also communicates with the diffuser flow passage 11. When the compressor impeller 9 rotates, the air is sucked from the intake port 10 into the compressor housing 5. The sucked air is accelerated by an effect of a centrifugal force in the process of flowing through blades of the compressor impeller 9. The accelerated air is pressurized by the diffuser flow passage 11 and the compressor scroll flow passage 12. The pressurized air flows out from an exhaust port (not shown) and is led to the intake port of the engine.

An exhaust port 13 is formed in the turbine housing 3. The exhaust port 13 is opened on the left side of the turbocharger TC. The exhaust port 13 is connected to an exhaust gas purification device (not shown). A flow passage 14 and a turbine scroll flow passage 15 are formed in the turbine housing 3. The turbine scroll flow passage 15 has an annular shape. The turbine scroll flow passage 15 is located on an outer side with respect to the turbine impeller 8 in a radial direction. The flow passage 14 is located between the turbine impeller 8 and the turbine scroll flow passage 15.

The turbine scroll flow passage 15 communicates with a gas inlet port (not shown). Exhaust gas discharged from an exhaust manifold (not shown) of the engine is led to the gas inlet port. The turbine scroll flow passage 15 also communicates with the flow passage 14. The exhaust gas led from the gas inlet port to the turbine scroll flow passage 15 is led to the exhaust port 13 via the flow passage 14 and spaces between blades of the turbine impeller 8. The exhaust gas led to the exhaust port 13 rotates the turbine impeller 8 in the process of flowing therethrough.

A rotational force of the turbine impeller 8 is transmitted to the compressor impeller 9 via the shaft 7. When the compressor impeller 9 rotates, the air is pressurized as described above. In such a manner, the air is led to the intake port of the engine.

Figure 2:
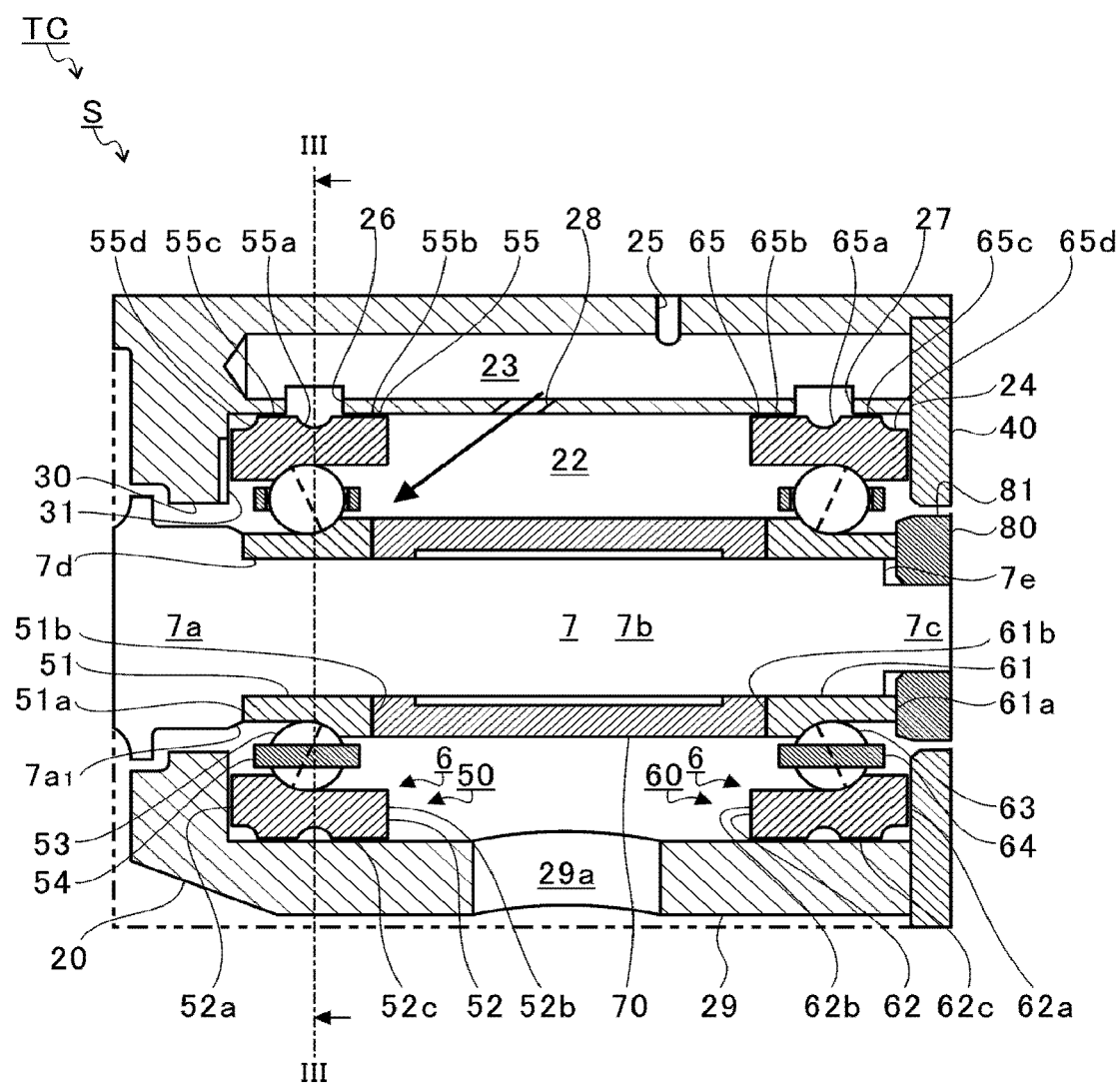
FIG. 2 is an extracted view for illustrating a portion indicated by two-dot chain lines of FIG. 1.

FIG. 2 is an extracted view for illustrating a portion indicated by two-dot chain lines of FIG. 1. As illustrated in FIG. 2, the turbocharger TC includes a bearing structure S. In the bearing structure S, a branch-origin oil passage 23 is formed in the bearing housing 20. The branch-origin oil passage 23 extends in an axial direction of the shaft 7 (rotation axis direction, hereinafter referred to simply as "axial direction"). The branch-origin oil passage 23 extends substantially parallel to the bearing hole 22. The branch-origin oil passage 23 is located on an upper side in the vertical direction, with respect to the bearing hole 22.

The bearing hole 22 and the branch-origin oil passage 23 are opened in an opening surface 24 of the bearing housing 20. The opening surface 24 extends, for example, perpendicular to the axial direction. A seal plate 40 is mounted to the opening surface 24. The seal plate 40 has a substantially annular shape. The seal plate 40 closes an opening of the branch-origin oil passage 23. An inner diameter of the seal plate 40 is smaller than an inner diameter of the bearing hole 22. A part of the seal plate 40 on an inner side in the radial direction protrudes toward an inner side in the radial direction with respect to the bearing hole 22.

A through hole 25 is opened with respect to the branch-origin oil passage 23. The through hole 25 is formed in the bearing housing 20. The through hole 25 extends from an outside of the bearing housing 20 to the branch-origin oil passage 23. Oil fed out from an oil pump (not shown) is supplied from the through hole 25 to the branch-origin oil passage 23.

A first oil passage 26, a second oil passage 27, and a third oil passage 28 are formed in the bearing housing 20. The first oil passage 26, the second oil passage 27, and the third oil passage 28 are opened with respect to the branch-origin oil passage 23. The first oil passage 26, the second oil passage 27, and the third oil passage 28 are also opened with respect to an inner peripheral surface of the bearing hole 22. The first oil passage 26, the second oil passage 27, and the third oil passage 28 allow the branch-origin oil passage 23 and the bearing hole 22 to communicate with each other.

The first oil passage 26 is formed on the left side of FIG. 2 (on the turbine impeller 8 side, or on the side of a turbine-side bearing 50 described later), with respect to the second oil passage 27. The third oil passage 28 is formed between the first oil passage 26 and the second oil passage 27. The third oil passage 28 is opened between the first oil passage 26 and the second oil passage 27 in the inner peripheral surface of the bearing hole 22.

An oil discharging hole 29a is formed in a lower wall portion 29 of the bearing housing 20. The lower wall portion 29 is located on a lower side of FIG. 2 (lower side in the vertical direction) with respect to the bearing hole 22. The lower wall portion 29 forms a part of (the inner peripheral surface of) the bearing hole 22. The oil discharging hole 29a penetrates through the lower wall portion 29 in a direction perpendicular to the axial direction. The oil discharging hole 29a is opened in the inner peripheral surface of the bearing hole 22. A position of the oil discharging hole 29a in the axial direction is, for example, between the first oil passage 26 and the second oil passage 27 (between the pair of rolling bearings 6).

A side wall portion 30 is formed on the bearing housing 20. The side wall portion 30 protrudes from the inner peripheral surface of the bearing hole 22 toward an inner side in the radial direction. The side wall portion 30 has an annular shape. A right end surface 31 (opposing surface) of the side wall portion 30 in FIG. 2 (compressor impeller 9 side) extends, for example, in the radial direction. The side wall portion 30 is formed integrally with the bearing housing 20. However, the side wall portion 30 may be a member that is separate from the bearing housing 20 and may be mounted to the bearing housing 20.

Further, the shaft 7 is inserted through the bearing hole 22. The shaft 7 includes a large-diameter portion 7a, a middle-diameter portion 7b, and a small-diameter portion 7c. An outer diameter of the middle-diameter portion 7b is smaller than an outer diameter of the large-diameter portion 7a. The middle-diameter portion 7b is located on the right side of FIG. 2 (compressor impeller 9 side) with respect to the large-diameter portion 7a. An outer diameter of the small-diameter portion 7c is smaller than the outer diameter of the middle-diameter portion 7b. The small-diameter portion 7c is located on the compressor impeller 9 side with respect to the middle-diameter portion 7b. A position of the middle-diameter portion 7b in the axial direction is located between the side wall portion 30 and the seal plate 40.

A first step surface 7d and a second step surface 7e are formed on the shaft 7. The first step surface 7d radially extends from an outer peripheral surface of the large-diameter portion 7a to an outer peripheral surface of the middle-diameter portion 7b. The second step surface 7e radially extends from the outer peripheral surface of the middle-diameter portion 7b to an outer peripheral surface of the small-diameter portion 7c. A tapered surface Tal is formed on the middle-diameter portion 7b side of the outer peripheral surface of the large-diameter portion 7a. An outer diameter of the tapered surface Tal decreases as closer to the middle-diameter portion 7b. A part of the tapered surface Tal having the smallest outer diameter continues to the first step surface 7d.

The rolling bearings 6 are arranged in the bearing hole 22. Two rolling bearings 6 are provided in the bearing hole 22. The two rolling bearings 6 are apart from each other in the axial direction. In the following description, when the two rolling bearings 6 are distinguished, the rolling bearing 6 arranged on the left side of FIG. 2 (turbine impeller 8 side) is referred to as "turbine-side bearing 50". The rolling bearing 6 arranged on the right side of FIG. 2 (compressor impeller 9 side) is referred to as "compressor-side bearing 60".

The turbine-side bearing 50 includes an inner ring 51, an outer ring 52, rolling elements 53, and a cage 54. The inner ring 51 is mounted to the outer peripheral surface of the middle-diameter portion 7b of the shaft 7. The inner ring 51 rotates integrally with the shaft V. The outer ring 52 is provided on an outer side in the radial direction with respect to the inner ring 51. The outer ring 52 is opposed to the inner peripheral surface of the bearing hole 22. A plurality of rolling elements 53 are arranged between the outer ring 52 and the inner ring 51. The cage 54 retains the plurality of rolling elements 53.

Similarly, the compressor-side bearing 60 includes an inner ring 61, an outer ring 62, rolling elements 63, and a cage 64. The inner ring 61 is mounted to the outer peripheral surface of the middle-diameter portion 7b of the shaft 7. The inner ring 61 rotates integrally with the shaft 7. The outer ring 62 is provided on an outer side in the radial direction with respect to the inner ring 61. The outer ring 62 is opposed to the inner peripheral surface of the bearing hole 22. A plurality of rolling elements 63 are arranged between the outer ring 62 and the inner ring 61. The cage 64 retains the plurality of rolling elements 63.

The rolling bearings 6 are, for example, angular bearings. Connection lines indicated by broken lines in FIG. 2 each connect a position at which the outer ring 52, 62 of the rolling bearing 6 is closest to (or is brought into abutment against) the rolling element 53, 63 and a position at which the inner ring 51, 61 is closest to (or is brought into abutment against) the rolling element 53, 63. The connection lines each indicate a contact angle of the rolling bearing 6. The connection lines are inclined with respect to a surface perpendicular to the axial direction of the shaft 7. The connection line of the turbine-side bearing 50 is inclined in a direction spaced away from the compressor-side bearing 60, as closer to the outer side in the radial direction. The connection line of the compressor-side bearing 60 is inclined in a direction spaced away from the turbine-side bearing 50, as closer to the outer side in the radial direction.

In the inner ring 51 of the turbine-side bearing 50, a thickness of an outer lateral surface 51a on the large-diameter portion 7a side is smaller than a thickness of an inner lateral surface 51b on the compressor-side bearing 60 side. In the inner ring 61 of the compressor-side bearing 60, a thickness of an outer lateral surface 61a on the seal plate 40 side is smaller than a thickness of an inner lateral surface 61b on the turbine-side bearing 50 side. However, the thickness of the outer lateral surface 51a, 61a may be larger than the thickness of the inner lateral surface 51b, 61b or may be equal to the thickness of the inner lateral surface 51b, 61b.

In the outer ring 52 of the turbine-side bearing 50, a thickness of an outer lateral surface 52a (lateral surface) on the side wall portion 30 side is approximately equal to a thickness of an inner lateral surface 52b on the compressor-side bearing 60 side. In the outer ring 62, a thickness of an outer lateral surface 62a on the seal plate 40 side is approximately equal to a thickness of an inner lateral surface 62b on the turbine-side bearing 50 side. However, the thickness of the outer lateral surface 52a, 62a may be larger or smaller than the thickness of the inner lateral surface 52b, 62b.

The inner ring 51 (outer lateral surface 51a) of the turbine-side bearing 50 is brought into abutment against the first step surface 7d. The inner ring 51 is brought into abutment against the first step surface 7d from the right side of FIG. 2 (compressor impeller 9 side). An outer diameter of the first step surface 7d is approximately equal to an outer diameter of the outer lateral surface 51a of the inner ring 51. However, the outer diameter of the first step surface 7d may be larger or smaller than the outer diameter of the outer lateral surface 51a.

The outer ring 52 (outer lateral surface 52a) of the turbine-side bearing 50 is opposed to the end surface 31 of the side wall portion 30 in the axial direction. The end surface 31 is opposed to the outer lateral surface 52a of the outer ring 52 from the left side of FIG. 2 (turbine impeller 8 side).

A spacer 70 is provided between the inner ring 51 and the inner ring 61. The spacer 70 has an annular shape. The shaft 7 is inserted through the spacer 70. The spacer 70 is opposed to the inner lateral surface 51b of the inner ring 51 and the inner lateral surface 61b of the inner ring 61 in the axial direction. An outer diameter of the spacer 70 is approximately equal to the outer diameter of the inner lateral surface 51b, 61b of the inner ring 51, 61. However, the outer diameter of the spacer 70 may be larger or smaller than the outer diameter of the inner lateral surface 51b, 61b of the inner ring 51, 61. Further, a spring and spring stoppers may be provided in place of the spacer 70.

An oil thrower member 80 is mounted to the small-diameter portion 7c of the shaft 7. The oil thrower member 80 causes oil to scatter toward the outer side in the radial direction, after lubricating the compressor-side bearing 60. An insertion portion 81 of the oil thrower member 80 is inserted through the seal plate 40. The seal plate 40 is located on the outer side in the radial direction with respect to the insertion portion 81. The seal plate 40 is opposed to the outer ring 62 (outer lateral surface 62a) in the axial direction.

An outer diameter of the insertion portion 81 is larger than the outer diameter of the outer lateral surface 61a of the inner ring 61 of the compressor-side bearing 60. However, it is only required that the outer diameter of the insertion portion 81 be larger than at least an inner diameter of the outer lateral surface 61a. The insertion portion 81 is brought into abutment against the outer lateral surface 61a. The inner ring 61 is brought into abutment against the insertion portion 81 from the left side of FIG. 2 (turbine impeller 8 side).

The turbine-side bearing 50 (inner ring 51), the spacer 70, the compressor-side bearing 60 (inner ring 61), the oil thrower member 80, and the compressor impeller 9 are mounted to the shaft 7 from the end portion of the shaft 7 on the compressor impeller 9 side in the order of the turbine-side bearing 50, the spacer 70, the compressor-side bearing 60, the oil thrower member 80, and the compressor impeller 9. Fastening bolts are fastened to the end portion of the shaft 7 on the compressor impeller 9 side. A compressive force (axial force) acts on those members in the axial direction. The turbine-side bearing 50, the spacer 70, the compressor-side bearing 60, the oil thrower member 80, and the compressor impeller 9 rotate integrally with the shaft 7.

A damper portion 55 is formed on an outer peripheral surface 52c of the outer ring 52 of the turbine-side bearing 50. The damper portion 55 includes an annular groove 55a, an inner parallel surface 55b, an outer parallel surface 55c, and a cutout portion 55d. The annular groove 55a, the inner parallel surface 55b, the outer parallel surface 55c, and the cutout portion 55d each have an annular shape. The annular groove 55a divides the outer peripheral surface 52c in the axial direction. A surface located closer to the compressor-side bearing 60 with respect to the annular groove 55a corresponds to the inner parallel surface 55b. A surface located closer to the side wall portion 30 with respect to the annular groove 55a corresponds to the outer parallel surface 55c. The cutout portion 55d is formed on the side wall portion 30 side of the outer parallel surface 55c. The outer parallel surface 55c is shorter than the inner parallel surface 55b in the axial direction by the length corresponding to the cutout portion 55d.

The first oil passage 26 is opened toward the turbine-side bearing 50 in the inner peripheral surface of the bearing hole 22. The first oil passage 26 is opposed to the outer side of the annular groove 55a in the radial direction. Oil is supplied from the first oil passage 26 to the annular groove 55a. The oil spreads throughout the entire periphery of the annular groove 55a. The oil flows from the annular groove 55a toward the inner parallel surface 55b side and the outer parallel surface 55c side. The oil tends to flow toward the side of the outer parallel surface 55c having a small length. Therefore, a cooling effect on the side wall portion 30 side is improved. Vibration of the shaft 7 is curbed by the oil supplied between the inner peripheral surface of the bearing hole 22 and each of the inner parallel surface 55b and the outer parallel surface 55c.

Here, the turbine-side bearing 50 is described in detail. The compressor-side bearing 60 also has the same configuration. A damper portion 65 is formed on the outer peripheral surface 62c of the outer ring 62. The damper portion 65 includes an annular groove 65a, an inner parallel surface 65b, an outer parallel surface 65c, and a cutout portion 65d. The second oil passage 27 is opened toward the compressor-side bearing 60 in the inner peripheral surface of the bearing hole 22. The second oil passage 27 is opposed to the outer side of the annular groove 65a in the radial direction. The vibration of the shaft 7 is suppressed by the oil supplied between the inner peripheral surface of the bearing hole 22 and each of the inner parallel surface 65b and the outer parallel surface 65c.

In such a manner, the damper portions 55 and 65 are formed on the outer rings 52 and 62, respectively. Therefore, support member configured to support the turbine-side bearing 50 and the compressor-side bearing 60 and function as the damper portions are not required. The outer rings 52 and 62 are smaller in weight than such a support member. Accordingly, the damper function is improved.

The illustrated shape of each of the damper portions 55 and 65 is merely an example. The damper portions 55 and 65 may have any shape as long as the vibration is curbed by the oil supplied between the bearing hole 22 and each of the outer rings 52 and 62. In order to allow the outer peripheral surfaces 52c and 62c of the outer rings 52 and 62 to function as the damper portions 55 and 65, the bearing hole 22 may be processed.

The curbing effect for the vibration of the shaft 7 can be changed by changing the lengths of the inner parallel surfaces 55b and 65b and the outer parallel surfaces 55c and 65c in the axial direction, without changing the overall shapes of the outer rings 52 and 62. Therefore, the damper portions 55 and 65 can be designed easily. Part of the oil passing through the damper portions 55 and 65 is supplied to the rolling elements 53 and 63 of the turbine-side bearing 50 and the compressor-side bearing 60 and thereafter is discharged from the oil discharging hole 29a.

The rolling bearings 6 are angular bearings, and therefore receive a thrust load of the shaft 7. When the thrust load acts on the shaft 7 leftward of FIG. 2, the outer ring 52 of the turbine-side bearing 50 presses the side wall portion 30. When the thrust load acts on the shaft 7 rightward of FIG. 2, the outer ring 62 of the compressor-side bearing 60 presses the seal plate 40. Movement of the shaft 7 caused by the thrust load is stopped by the side wall portion 30 and the seal plate 40.

No rotation stopper is provided to the outer rings 52 and 62. When the outer rings 52 and 62 do not press the side wall portion 30 and the seal plate 40, the outer rings 52 and 62 are relatively rotatable (freely rotatable) in a circumferential direction of the shaft 7 with respect to the bearing housing 20 (bearing hole 22). When the shaft 7 rotates, the inner rings 51 and 61 rotate integrally with the shaft 7. The rolling elements 53 and 63 rotate along with rotation of the inner rings 51 and 61. The rolling elements 53 and 63 move in a circumferential direction of the inner rings 51 and 61, respectively. The outer rings 52 and 62 rotate in the circumferential direction of the shaft 7 along with the rotation and movement of the rolling elements 53 and 63 or along with a flow of the oil. The rotation speed of the outer ring 52 is lower than the rotation speed of the inner ring 51. The vibration curbing effect is improved by arranging the outer rings 52 and 62 relatively rotatable.

The pair of rolling bearings 6 have a face-to-face duplex configuration. Therefore, there is no need to provide a spacer (seat for outer rings) between the outer ring 52 and the outer ring 62. The outer rings 52 and 62 cannot be preloaded. Therefore, the outer ring 52 and 62 can rotate easily. As a result, the vibration curbing effect of the damper portions 55 and 65 is improved.

In the bearing structure S, the temperature on the left side of FIG. 2 (turbine impeller 8 side or turbine-side bearing 50 side) is liable to be higher than the temperature on the right side (compressor impeller 9 side or compressor-side bearing 60 side). Therefore, the third oil passage 28 is formed. The shaft 7, the spacer 70 configured to rotate integrally with the shaft 7, and the inner ring 51 are located on an extension of the third oil passage 28.

Through the shaft 7, the spacer 70 configured to rotate integrally with the shaft 7, and the inner ring 51, a part of the bearing structure S that is liable to be higher in temperature is efficiently cooled. In particular, since the amount of oil required for lubricating the rolling bearings 6 is small, mechanical losses are caused if a large amount of oil is supplied to the turbine-side bearing 50. By forming the third oil passage 28, a cooling effect for a high-temperature part can be improved without excessively increasing the amount of oil supplied to the turbine-side bearing 50. Further, the temperature of the oil supplied to the rolling bearings 6 is increased. By forming the third oil passage 28, the high-temperature part can be efficiently cooled with the low-temperature oil from the branch-origin oil passage 23.

If a spacer is provided between the outer ring 52 and the outer ring 62, the spacer will face the third oil passage 28. The spacer will block the supply of oil from the third oil passage 28 to the high-temperature part. The pair of rolling bearings 6 have the face-to-face duplex configuration, and hence there is no need to provide the spacer. As a result, the oil can be supplied easily from the third oil passage 28 to the high-temperature part.

Figure 3:
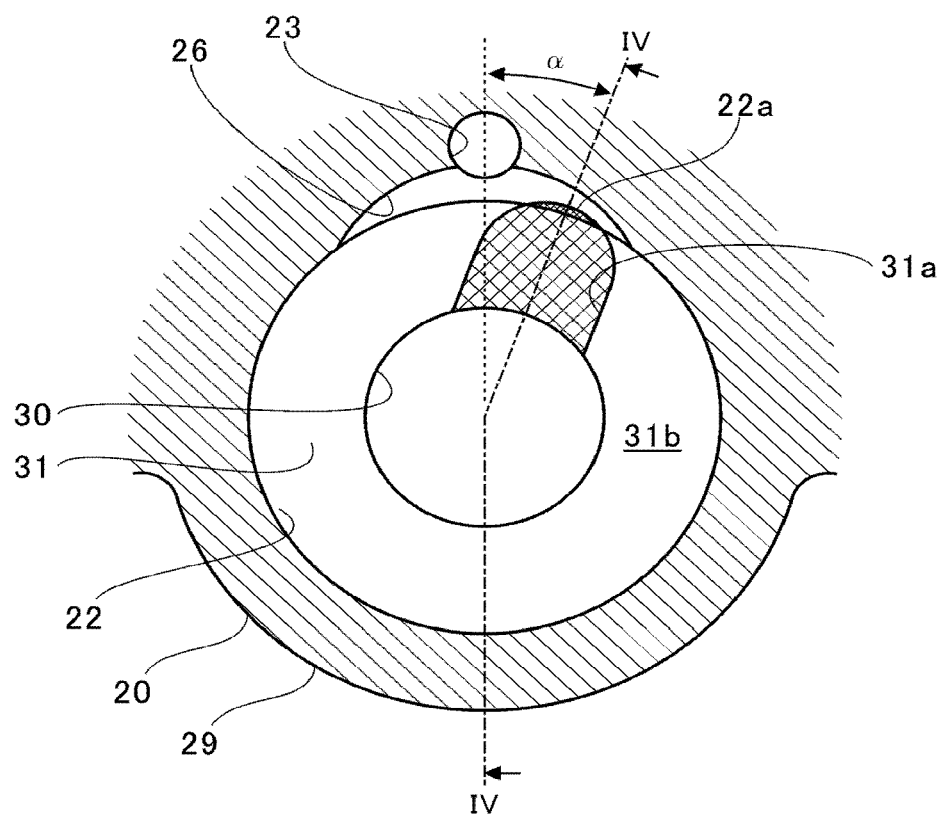
FIG. 3 is a sectional view taken along the line of FIG. 2.

FIG. 3 is a sectional view taken along the line of FIG. 2. In FIG. 3, only the bearing housing 20 is illustrated. In FIG. 3, a first oil supply groove 31a is illustrated with coarse cross hatching, and a second oil supply groove 22a is illustrated with fine cross hatching, which will be described later. As illustrated in FIG. 3, the first oil passage 26 has a substantially crescent shape as seen from the axial direction. The first oil passage 26 extends from the inner peripheral surface of the bearing hole 22 toward the outer side in the radial direction. A curvature radius of an inner peripheral surface of the first oil passage 26 is smaller than the inner diameter of the bearing hole 22.

In the side wall portion 30 of the bearing housing 20, the first oil supply groove 31a is formed on the end surface 31 on the turbine-side bearing 50 side (near side on the drawing sheet of FIG. 3). The first oil supply groove 31a extends in, for example, the radial direction. The first oil supply groove 31a is formed at a position turned by a predetermined angle α from a connection line connecting a center of the bearing hole 22 and a center of the branch-origin oil passage 23. When a rotation direction of the shaft 7 is a clockwise in FIG. 3, the first oil supply groove 31a is located on a forward side in the rotation direction of the shaft 7 with respect to the connection line. When the rotation direction of the shaft 7 is a counterclockwise in FIG. 3, the first oil supply groove 31a is located on a backward side in the rotation direction of the shaft 7 with respect to the connection line. When the up-and-down direction of FIG. 3 corresponds to the vertical direction, the first oil supply groove 31a is formed at a position turned by the predetermined angle α in the circumferential direction of the shaft 7 from a vertical plane passing through the center of the bearing hole 22.

A phase of the second oil supply groove 22a described later is formed so as to correspond to a phase of the first oil supply groove 31a. The thickness of a wall portion between the second oil supply groove 22a and the branch-origin oil passage 23 is sufficiently secured by shifting the phase of the first oil supply groove 31a with respect to the above-mentioned connection line. However, as long as the strength of the wall portion does not become insufficient, the first oil supply groove 31a and the second oil supply groove 22a may be formed so that the above-mentioned vertical plane is positioned at a center thereof. Further, the first oil passage 26 described above may be formed into an annular shape. In this case, the first oil supply groove 31a and the second oil supply groove 22a may be formed at any position in the circumferential direction of the shaft 7.

The first oil supply groove 31a is formed, for example, by cutting from the center side of the bearing hole 22 with using a tool having a diameter smaller than an inner diameter of the side wall portion 30. However, the first oil supply groove 31a may be formed by other means.

An opposing portion 31b is formed on the end surface 31 of the side wall portion 30. The opposing portion 31b continues to the first oil supply groove 31a in the circumferential direction of the shaft 7. The opposing portion 31b is, for example, a remaining part of the end surface 31 at which the first oil supply groove 31a is not formed. A part of the end surface 31 opposed to the outer lateral surface 52a in the axial direction has a portion at which the first oil supply groove 31a is not formed. In the end surface 31, the opposing portion 31b is closest to the outer lateral surface 52a of the outer ring 52.

As described above, the thrust load causes the outer ring 52 to press the end surface 31. When the opposing portion 31b is not formed, the outer ring 52 is brought into abutment against a bottom surface of the first oil supply groove 31a. As a result, the first oil supply groove 31a is closed by the outer ring 52. By forming the opposing portion 31b, the outer ring 52 is positioned in the axial direction by the opposing portion 31b.

The opposing portion 31b extends in the circumferential direction of the shaft 7 over about one-eighth (equal to or smaller than one-half, or equal to or smaller than one-fourth) of the entire periphery. Therefore, even when the outer ring 52 is pressed against the end surface 31, the outer ring 52 is less liable to incline.

Figure 4:
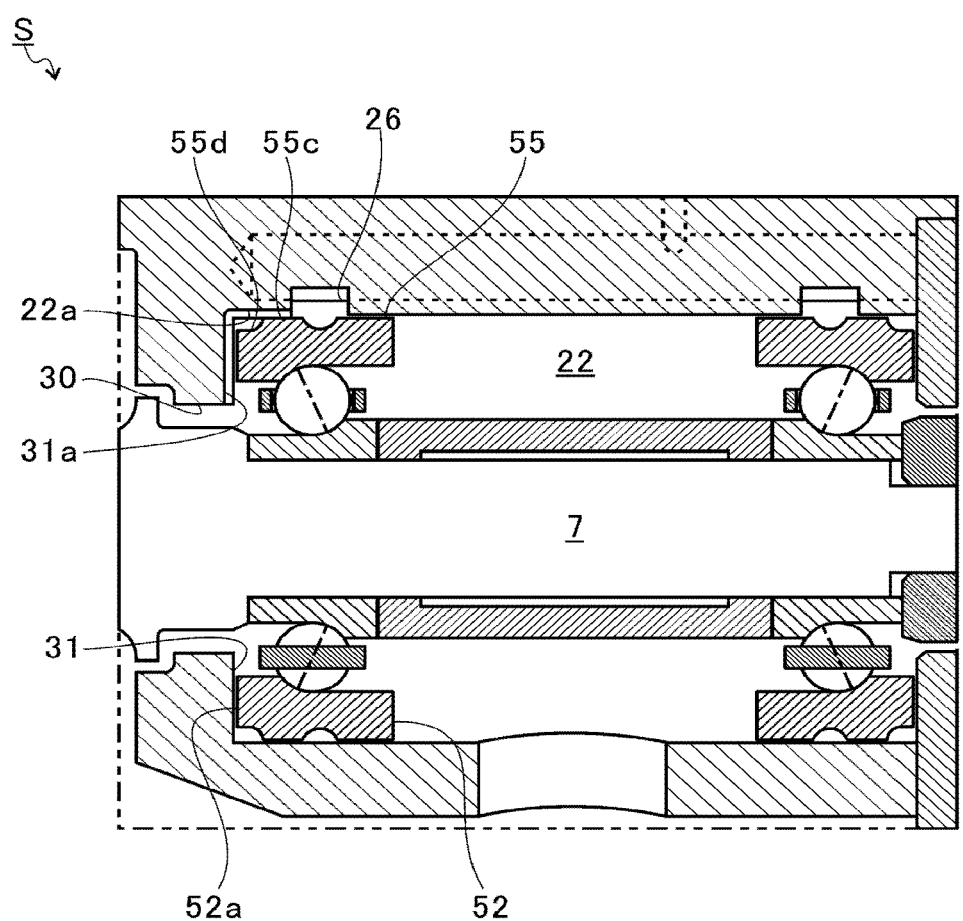
FIG. 4 is a sectional view for illustrating a bearing structure.

FIG. 4 is a sectional view for illustrating the bearing structure S. In FIG. 4, a cross section of the bearing structure S taken along the line IV-IV of FIG. 3 is illustrated. That is, the upper portion above the center axis of the shaft 7 in FIG. 4 corresponds to a cross section illustrated in FIG. 3 obtained by shifting the phase in the circumferential direction of the shaft 7 by the predetermined angle α.

As illustrated in FIG. 4, the first oil supply groove 31a is opposed to at least the damper portion 55 and the outer lateral surface 52a of the outer ring 52. Here, an outermost part in the radial direction of the first oil supply groove 31a continues to the inner peripheral surface of the bearing hole 22. The outermost part in the radial direction of the first oil supply groove 31a is flush with the damper portion 55 of the outer ring 52, or is located on the outer side in the radial direction with respect to the damper portion 55. The first oil supply groove 31a extends to at least a position opposed to, in the axial direction, an innermost part in the radial direction of the outer lateral surface 52a of the outer ring 52. The first oil supply groove 31a extends to a position on the inner side in the radial direction with respect to the outer ring 52. The first oil supply groove 31a extends to an end portion of the end surface 31 on the innermost side in the radial direction. However, it is only required that a part of the first oil supply groove 31a be opposed to the outer lateral surface 52a in the axial direction.

By forming the first oil supply groove 31a, the amount of oil that flows from the damper portion 55 toward the outer lateral surface 52a side increases. The cooling effect for the high-temperature part is improved. The oil flows in the axial direction on the turbine impeller 8 side by the amount corresponding to a depth of the first oil supply groove 31a. Therefore, the cooling effect is improved.

The second oil supply groove 22a is formed in the inner peripheral surface of the bearing hole 22. The second oil supply groove 22a is opposed to the outer parallel surface 55c and the cutout portion 55d of the damper portion 55. The second oil supply groove 22a is located on the outer side of the outer parallel surface 55c in the radial direction. The second oil supply groove 22a extends in the axial direction from the first oil passage 26 to the first oil supply groove 31a. However, it is only required that the second oil supply groove 22a extend to at least the first oil supply groove 31a, and the second oil supply groove 22a may be apart from the first oil passage 26 in the axial direction.

By forming the second oil supply groove 22a, the amount of oil that flows from the damper portion 55 toward the outer lateral surface 52a side increases. The cooling effect for the high-temperature part is improved. Further, with the rotation of the outer ring 52, the oil can spread easily throughout the entire inner peripheral surface of the bearing hole 22. Therefore, the entire inner peripheral surface of the bearing hole 22 is cooled.

Although the embodiment of the present disclosure has been described above with reference to the attached drawings, it is understood that the present disclosure is not limited to the above-mentioned embodiment. It is obvious that a person skilled in the art can conceive of various alternations and modifications within the scope of claims, and those examples are construed as falling within the technical scope of the present disclosure.

In the above-mentioned embodiment, description is given of the case in which the two rolling bearings 6 are provided apart from each other in the axial direction in the bearing hole 22. However, three or more rolling bearings 6 may be arranged.

In the above-mentioned embodiment, description is given of the case in which the first oil supply groove 31a and the second oil supply groove 22a are formed only on the turbine-side bearing 50 side. However, the first oil supply groove 31a and the second oil supply groove 22a may be similarly formed also on the compressor-side bearing 60 side.

In the above-mentioned embodiment, description is given of the case in which the outer rings 52 and 62 are rotatable with respect to the bearing housing 20 in which the bearing hole 22 is formed. However, as long as the damper portions 55 and 65 are provided to the outer rings 52 and 62, respectively, the movement of the outer rings 52 and 62 in the rotation direction may be restricted.

In the above-mentioned embodiment, description is given of the case in which the opposing portion 31b is formed on the end surface 31 of the side wall portion 30. However, the opposing portion 31b is not essential.

In the above-mentioned embodiment, description is given of the case in which the second oil supply groove 22a is formed on the inner peripheral surface of the bearing hole 22. However, the second oil supply groove 22a is not essential.

In the above-mentioned embodiment, description is given of the case in which, in addition to the first oil passage 26 and the second oil passage 27, the third oil passage 28 is formed in the bearing housing 20. However, the third oil passage 28 is not essential.

In the above-mentioned embodiment, description is given of the case in which the pair of rolling bearings 6 are angular bearings having the face-to-face duplex configuration. However, the rolling bearings 6 may be rolling bearings other than the angular bearings (for example, deep-groove ball bearings or self-aligning ball bearings). Further, the pair of rolling bearings 6 may have a back-to-back duplex configuration.

INDUSTRIAL APPLICABILITY

The present disclosure can be used for a bearing structure and a turbocharger.

What is claimed is:

1. A bearing structure, comprising:
   a shaft provided with a turbine impeller;
   a pair of rolling bearings accommodated in a bearing hole and each including:
      an inner ring mounted on the shaft so as to integrally rotate with the shaft; and
      an outer ring having a damper portion formed on an outer periphery of the outer ring;
   an opposing surface opposed to, in an axial direction of the shaft from a turbine impeller side, a lateral surface of the outer ring of the rolling bearing provided on the turbine impeller side; and
   a first oil supply groove formed in the opposing surface and opposed to at least the damper portion and the lateral surface of the outer ring.

2. The bearing structure according to claim 1, wherein the outer ring is rotatable with respect to a bearing housing in which the bearing hole is formed.

3. The bearing structure according to claim 2,
   wherein the first oil supply groove extends to at least a position opposed to, in the axial direction of the shaft, an innermost portion in a radial direction of the lateral surface of the outer ring, and
   wherein the opposing surface includes an opposing portion that continues to the first oil supply groove in a circumferential direction of the shaft and that is closest to the lateral surface of the outer ring on the opposing surface.

4. The bearing structure according to claim 3, comprising a second oil supply groove formed in an inner peripheral surface of the bearing hole and opposed to the damper portion, and extending in the axial direction of the shaft to the first oil supply groove.

5. The bearing structure according to claim 4, comprising:
   a first oil passage formed in the inner peripheral surface of the bearing hole and opened toward the rolling bearing provided on the turbine impeller side;
   a second oil passage formed in the inner peripheral surface of the bearing hole and opened toward the rolling bearing provided on a compressor impeller side; and
   a third oil passage formed in the inner peripheral surface of the bearing hole and opened between the first oil passage and the second oil passage.

6. The bearing structure according to claim 3, comprising:
   a first oil passage formed in the inner peripheral surface of the bearing hole and opened toward the rolling bearing provided on the turbine impeller side;

a second oil passage formed in the inner peripheral surface of the bearing hole and opened toward the rolling bearing provided on a compressor impeller side; and a third oil passage formed in the inner peripheral surface of the bearing hole and opened between the first oil passage and the second oil passage.

7. The bearing structure according to claim 2, comprising:
a first oil passage formed in the inner peripheral surface of the bearing hole and opened toward the rolling bearing provided on the turbine impeller side;
a second oil passage formed in the inner peripheral surface of the bearing hole and opened toward the rolling bearing provided on a compressor impeller side; and
a third oil passage formed in the inner peripheral surface of the bearing hole and opened between the first oil passage and the second oil passage.

8. The bearing structure according to claim 2, comprising a second oil supply groove formed in an inner peripheral surface of the bearing hole and opposed to the damper portion, and extending in the axial direction of the shaft to the first oil supply groove.

9. The bearing structure according to claim 8, comprising:
a first oil passage formed in the inner peripheral surface of the bearing hole and opened toward the rolling hearing provided on the turbine impeller side;
a second oil passage formed in the inner peripheral surface of the bearing hole and opened toward the rolling bearing provided on a compressor impeller side; and
a third oil passage formed in the inner peripheral surface of the bearing hole and opened between the first oil passage and the second oil passage.

10. The bearing structure according to claim 1,
wherein the first oil supply groove extends to at least a position opposed to, in the axial direction of the shaft, an innermost portion in a radial direction of the lateral surface of the outer ring, and
wherein the opposing surface includes an opposing portion that continues to the first oil supply groove in a circumferential direction of the shaft and that is closest to the lateral surface of the outer ring on the opposing surface.

11. The bearing structure according to claim 10, comprising a second oil supply groove formed in an inner peripheral surface of the bearing hole and opposed to the damper portion, and extending in the axial direction of the shaft to the first oil supply groove.

12. The bearing structure according to claim 11, comprising:
a first oil passage formed in the inner peripheral surface of the bearing hole and opened toward the rolling bearing provided on the turbine impeller side;
a second oil passage formed in the inner peripheral surface of the bearing hole and opened toward the rolling bearing provided on a compressor impeller side; and
a third oil passage formed in the inner peripheral surface of the bearing bole and opened between the first oil passage and the second oil passage.

13. The bearing structure according to claim 10, comprising:
a first oil passage formed in the inner peripheral surface of the bearing hole and opened toward the rolling hearing provided on the turbine impeller side;
a second oil passage formed in the inner peripheral surface of the bearing hole and opened toward the rolling bearing provided on a compressor impeller side; and
a third oil passage formed in the inner peripheral surface of the bearing hole and opened between the first oil passage and the second oil passage.

14. The hearing structure according to claim 1, comprising a second oil supply groove formed in an inner peripheral surface of the hearing hole and opposed to the damper portion, and extending in the axial direction of the shaft to the first oil supply groove.

15. The bearing structure according to claim 14, comprising:
a first oil passage formed in the inner peripheral surface of the bearing hole and opened toward the rolling bearing provided on the turbine impeller side;
a second oil passage formed in the inner peripheral surface of the bearing hole and opened toward the rolling bearing provided on a compressor impeller side; and
a third oil passage formed in the inner peripheral surface of the bearing hole and opened between the first oil passage and the second oil passage.

16. The hearing structure according to claim 1, comprising:
a first oil passage formed in the inner peripheral surface of the bearing hole and opened toward the rolling bearing provided on the turbine impeller side;
a second oil passage formed in the inner peripheral surface of the bearing hole and opened toward the rolling bearing provided on a compressor impeller side; and
a third oil passage formed in the inner peripheral surface of the bearing hole and opened between the first oil passage and the second oil passage.

17. The bearing structure according to claim 16, wherein the pair of rolling bearings are angular bearings having a face-to-face duplex configuration.

18. A turbocharger comprising the bearing structure of claim 1.

* * * * *